US010855727B2

(12) United States Patent
Ahn et al.

(10) Patent No.: US 10,855,727 B2
(45) Date of Patent: Dec. 1, 2020

(54) VIDEO CALL MEDIATING APPARATUS, METHOD AND COMPUTER READABLE RECORDING MEDIUM THEREOF

(71) Applicant: HYPERCONNECT, INC., Seoul (KR)

(72) Inventors: Sangil Ahn, Cheongju-si (KR); Sangpil Yoon, Seongnam-si (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

(21) Appl. No.: 16/827,788

(22) Filed: Mar. 24, 2020

(65) Prior Publication Data

US 2020/0314154 A1    Oct. 1, 2020

(30) Foreign Application Priority Data

Mar. 25, 2019  (KR) ........................ 10-2019-0033483

(51) Int. Cl.
*H04N 7/15* (2006.01)
*H04L 29/06* (2006.01)
*G06F 3/0484* (2013.01)

(52) U.S. Cl.
CPC ........... *H04L 65/1066* (2013.01); *H04N 7/15* (2013.01); *G06F 3/0484* (2013.01)

(58) Field of Classification Search
CPC .......... G10L 17/00; H04N 5/232; H04N 7/14; H04R 1/32; H04M 3/42042; H04M 1/575; H04W 12/02

USPC ......... 348/14.01–14.16; 379/142.01, 142.03, 379/142.06

See application file for complete search history.

(56) References Cited

U.S. PATENT DOCUMENTS

| | | | |
|---|---|---|---|
| 2014/0118467 A1* | 5/2014 | Kim ......................... | H04N 7/15 348/14.07 |
| 2017/0064525 A1* | 3/2017 | Ben Arzi ......... | H04M 3/42382 |
| 2018/0270652 A1* | 9/2018 | Park ...................... | H04W 12/02 |
| 2018/0365904 A1* | 12/2018 | Holmes ............ | H04N 21/23418 |
| 2019/0182378 A1* | 6/2019 | Hou .................. | H04M 3/42153 |

* cited by examiner

*Primary Examiner* — Melur Ramakrishnaiah
(74) *Attorney, Agent, or Firm* — Sughrue Mion, PLLC

(57) ABSTRACT

A video call mediating method includes: connecting, by a first terminal and a second terminal, to a video call platform; extracting a first identifier (ID) of a user of the first terminal and a second ID of a user of the second terminal, that is not displayed on the first terminal and the second terminal, during a video call; creating a first identification code for the first terminal and a second identification code of the second terminal from the first ID and the second ID, respectively; establishing a first video call session between the first terminal and the second terminal; creating a first image and a second image corresponding to the first terminal and the second terminal, respectively, with reference to the first identification code and the second identification code, respectively; and displaying the first image and the second image on a display of the first terminal and on a display of the second terminal, respectively.

14 Claims, 15 Drawing Sheets

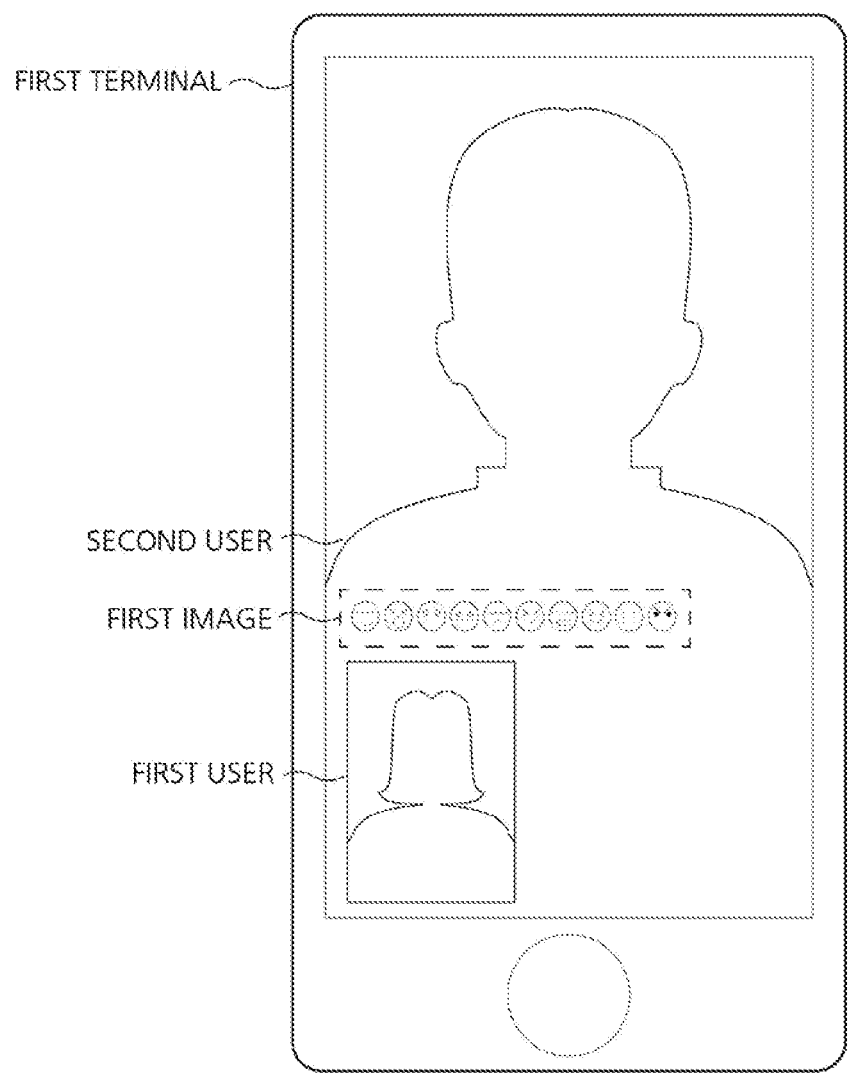

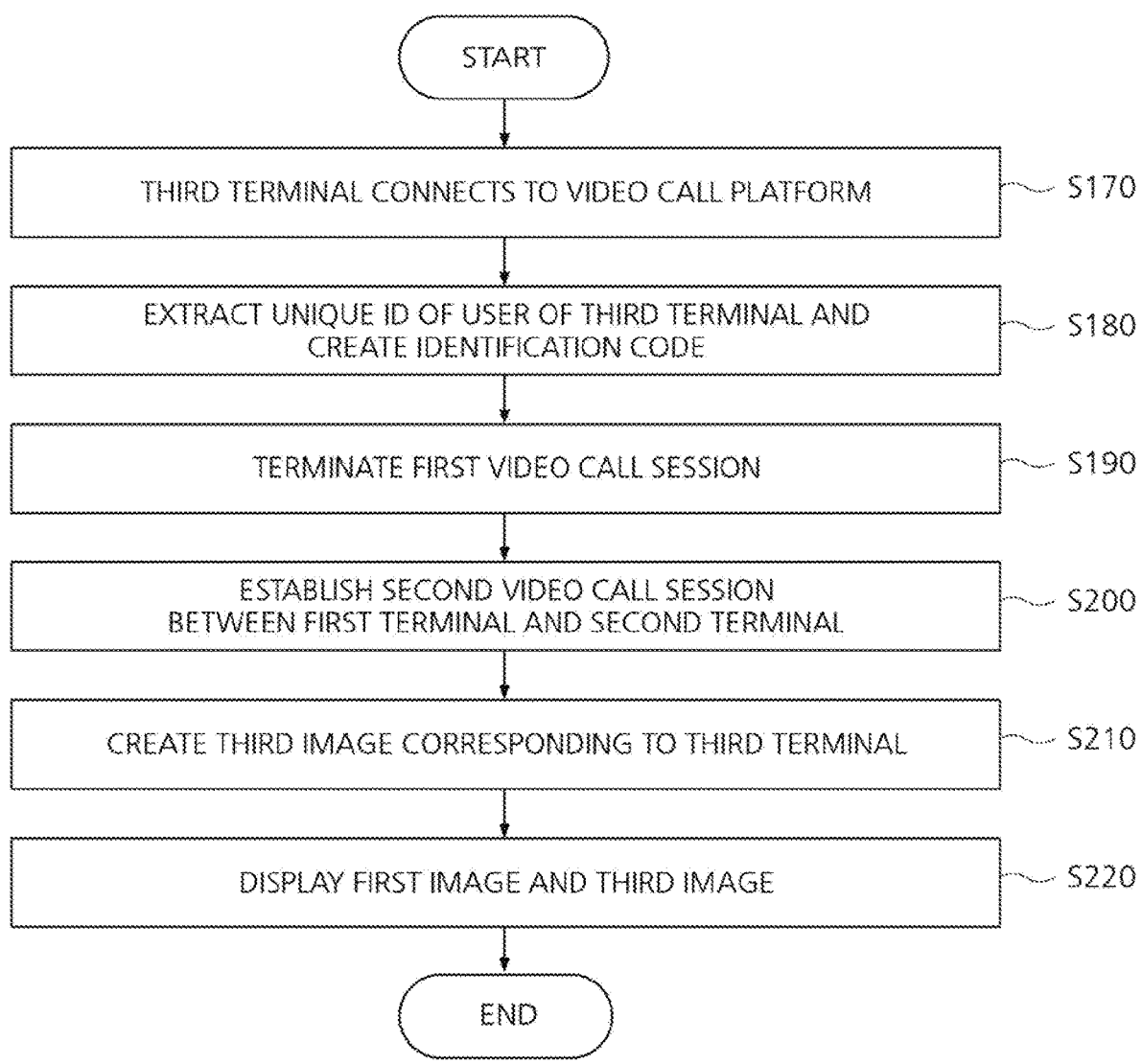

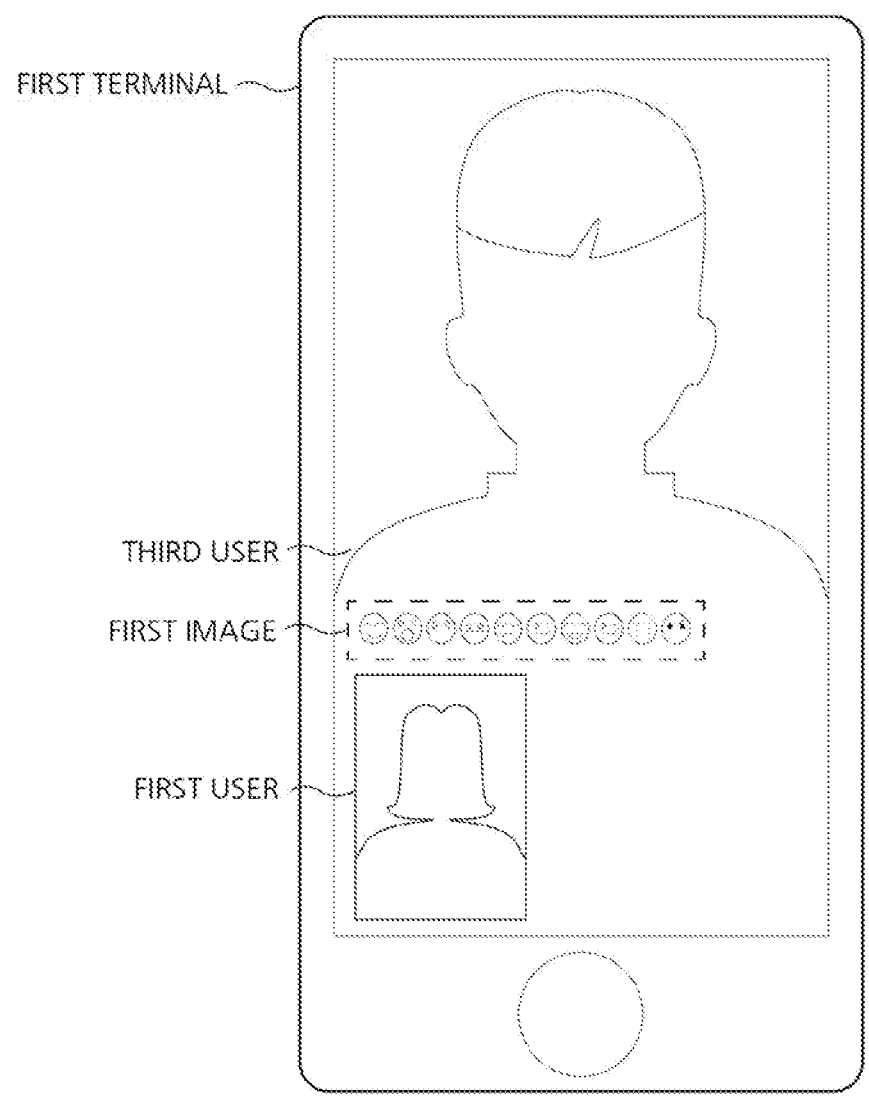

VIDEO CALL MEDIATING APPARATUS, METHOD AND COMPUTER READABLE RECORDING MEDIUM THEREOF

CROSS-REFERENCE TO THE RELATED APPLICATION

This application is based on and claims priority from Korean Patent Application No. 10-2019-0033483 filed on Mar. 25, 2019 in the Korean Intellectual Property Office, the disclosure of which is incorporated herein in its entirety by reference.

BACKGROUND

1. Field

The present disclosure relates to a video call mediating apparatus, method and computer readable recording medium thereof, and more particularly, to a video call mediating apparatus that is capable of specifying a video call user through an image displayed on a video call screen, and method and computer readable recording medium thereof.

2. Description of Related Art

With the development of communication technology and the miniaturization of electronic devices, personal terminals are becoming widespread to general consumers. In particular, recently, portable personal terminals such as smart phones or smart tablets are widely used.

Most portable personal terminals are equipped with a communication function, and thus these terminals may be connected to a communication network to exchange data with other terminals, and exchange, for example, video and audio with other terminals.

By using such a function, a video call can be made between a plurality of terminals. When a video call service is provided by accessing a video call platform, a video call can be made between people who do not know each other.

Meanwhile, a user provided with a video call service may own an account for accessing the video call platform, but considering the user interface and user experience, the user's account information may not be exposed on the video call screen.

In terms of privacy, when one user records a video call screen and opens it to the public, the account information of this user is not exposed on the video call screen, making it difficult to specify the user.

Therefore, there is a need for a method to specify a user in some cases without compromising a smooth user interface and user experience.

SUMMARY

A purpose of the present disclosure is to provide a video call mediating apparatus that provides an image capable of specifying a video call user on a video call screen, and a method and computer readable recording medium thereof.

A video call mediating method according to an embodiment of the present disclosure includes: connecting, by a first terminal and a second terminal, to a video call platform; extracting a first identifier (ID) of a user of the first terminal and a second ID of a user of the second terminal, that is not displayed on the first terminal and the second terminal, during a video call; creating a first identification code for the first terminal and a second identification code of the second terminal from the first ID and the second ID, respectively; establishing a first video call session between the first terminal and the second terminal; creating a first image and a second image corresponding to the first terminal and the second terminal, respectively, with reference to the first identification code and the second identification code, respectively; and displaying the first image and the second image on a display of the first terminal and on a display of the second terminal, respectively.

Further, the first image and the second image may be a combination of a plurality of sub images, and each of the first identification code and the second identification code may correspond to a number obtained by converting each of the first ID and the second ID into an antilogarithm number corresponding to a total number of the plurality of sub images available.

Further, the first image and the second image may include the sub image predetermined according to a number corresponding to each digit of the antilogarithm number.

Further, the displaying the first image and the second image may display the first image and the second image on the display of the first terminal and the display of the second terminal, in a floating form.

Further, the video call mediating method may further include: connecting, by a third terminal, to the video call platform; extracting a third ID of a user of the third terminal and creating a third identification code for the third terminal from the third ID; ending the first video call session; establishing a second video call session between the first terminal and the third terminal; creating a third image corresponding to the third terminal with reference to the third identification code; and displaying the first image and third image on the display of the first terminal and on a display of the third terminal.

Further, the video call mediating method may further include: newly creating the first identification code corresponding to the first terminal in response to the first video call session being ended; creating a fourth image corresponding to the first terminal with reference to the newly created first identification code; and displaying the fourth image on the display of the first terminal.

Further, the third image may be a combination of a plurality of sub images, and the creating the third identification code corresponding to the third terminal may include converting the third ID of the user of the third terminal into an antilogarithm number corresponding to a number of the plurality of sub images available.

Meanwhile, a computer readable recording medium where a program for performing a method is recorded may be provided.

Meanwhile, a video call mediating apparatus according to an embodiment of the present disclosure includes: a receiver for receiving a video call mediating request from a plurality of terminals; an extractor for extracting a unique ID corresponding to a user of the terminal that transmitted the video call mediating request; a controller for providing video call connection between at least two terminals among the plurality of terminals, creating an identification code for each of the at least two terminals connected by the video call, and creating a first image and a second image corresponding to the at least two terminals, respectively, with reference to the identification code; and an output interface for outputting the first image and the second image on the at least two terminals.

Further, the first image and the second image may be a combination of a plurality of sub images, and the identification code may correspond to a number obtained by converting the unique ID into an antilogarithm number corresponding to a total number of the plurality of sub images available.

Further, the first image and the second image may include the sub image predetermined according to a number corresponding to each digit of the antilogarithm number.

Further, the output interface may display the first image and the second image on a display of the at least two terminals, respectively, in a floating form.

The present disclosure may provide a video call mediating apparatus that provides an image that is capable of specifying a video call user on a video call screen, and a method and computer readable recording medium thereof.

BRIEF DESCRIPTION OF THE DRAWINGS

FIGS. 5A and 5B are views illustrating an example of how a user specifying image is displayed according to an embodiment of the present disclosure;

FIG. 7 is a flowchart illustrating a video call mediating method according to another embodiment of the present disclosure;

FIGS. 8A and 8B are views illustrating an example of how a user specifying image is displayed according to another embodiment of the present disclosure;

DETAILED DESCRIPTION

Figure 1:
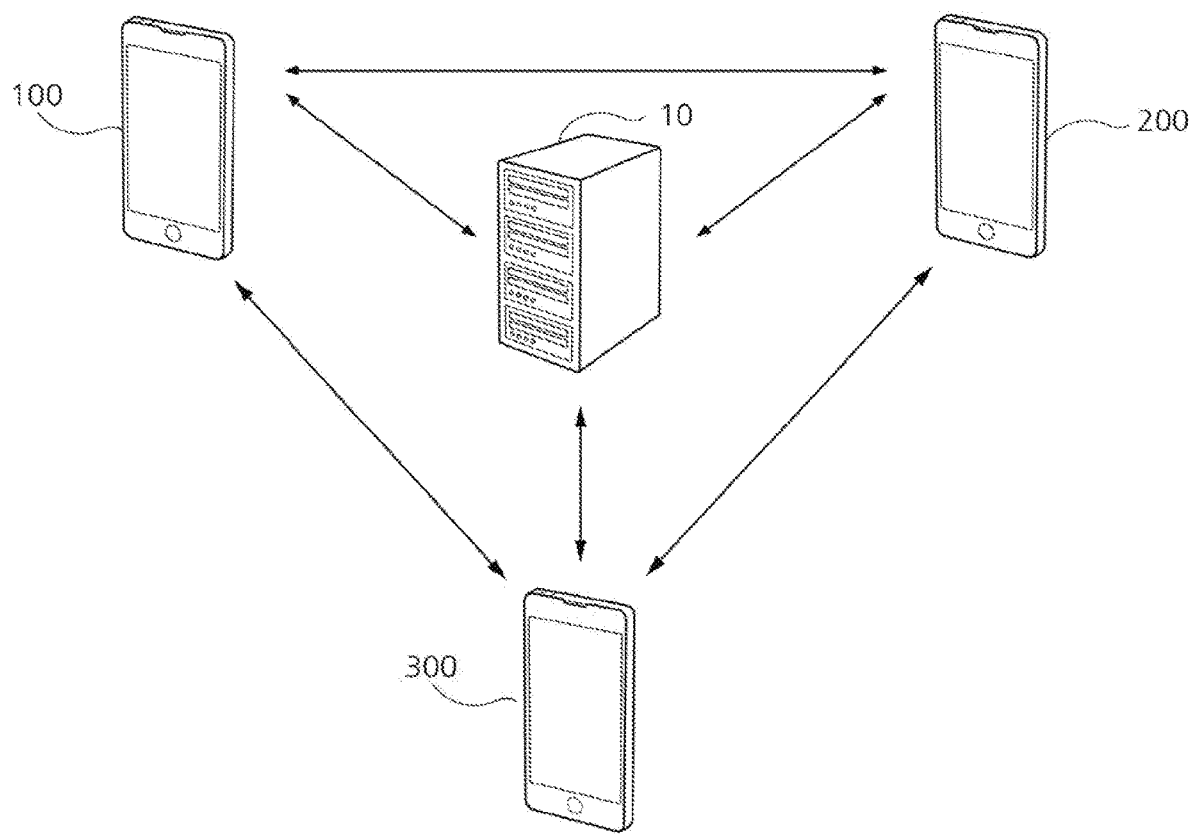
FIG. 1 is a view schematically illustrating an environment where a video call mediating apparatus according to the present disclosure operates.

Advantages and characteristics of the present disclosure, and methods for achieving those advantages and characteristics will become clear with reference to the embodiments described in detail hereinbelow together with the drawings attached. However, the present disclosure is not limited to the embodiments disclosed hereinbelow, but may be realized in various different forms, and thus these embodiments are provided in order to complete the disclosure of the present disclosure and to have a person skilled in the related art to completely understand the scope of the present disclosure, and the present disclosure shall only be defined by the scope of the claims. Throughout the entirety of the specification, like reference numerals indicate like component elements.

Although "first" or "second" and the like are used to describe various components, such components are not limited by the above terms. Such terms may be used only to distinguish one component from another component. Therefore, the first component mentioned hereinbelow may be a second component within the technical concept of the present disclosure.

The terms used herein are for the purpose of describing embodiments only and are not intended to limit the invention. In this specification, the singular also includes the plural unless specifically stated otherwise in the phrase. As used in this specification, "comprises" or "comprising" has the meaning that the stated component or step does not exclude the presence or addition of one or more other components or steps.

Unless otherwise defined, all terms used herein may be interpreted as meanings that can be commonly understood by those skilled in the related art. In addition, terms that are defined in a commonly used dictionary are not ideally or excessively interpreted unless they are specifically defined clearly.

FIG. 1 is a view schematically illustrating an environment where a video call mediating apparatus according to an embodiment of the present disclosure operates. Referring to FIG. 1, the environment where a first terminal 100, a second terminal 200, and a third terminal 300 operate, may include a server 10, and the first terminal 100, the second terminal 200, and the third terminal 300 that are mutually connected with the server 10. For convenience of explanation, FIG. 1 illustrates only three terminals, that is, the first terminal 100, the second terminal 200, and the third terminal 300, but more than three terminals may be included. With respect to the terminal that may be added, except for the description to be specifically mentioned, the descriptions of the first terminal 100, the second terminal 200, and the third terminal 300 may be applied.

The server 10 may be connected to a communication network. The server 10 may be mutually connected with another external apparatus through the communication network. The server 10 may transmit data to the other apparatus to which it is mutually connected or receive data from the other apparatus.

The communication network that is connected with the server 10 may include a wired communication network, a wireless communication network, or a composite communication network. The communication network may include a mobile communication network such as 3G, LTE, or LTE-A, etc. The communication network may include a wired or wireless communication network such as Wi-Fi, UMTS/GPRS, or Ethernet, etc. The communication network may include a local area communication network such as Magnetic Secure Transmission (MST), Radio Frequency Identification (RFID), Near Field Communication (NFC), ZigBee, Z-Wave, Bluetooth, Bluetooth Low Energy (BLE), or InfraRed communication (IR), etc. The communication network may include Local Area Network (LAN), Metropolitan Area Network (MAN), or Wide Area Network (WAN), etc.

The server 10 may be mutually connected with at least one of the first terminal 100, the second terminal 200, and the third terminal 300 through the communication network. If the server 10 is mutually connected with the first terminal 100, the server 10 may mutually send and receive data to and from the first terminal 100 through the communication network. If the server 10 is mutually connected with the second terminal 200, the server 10 may mutually send and receive data to and from the second terminal 200 through the communication network. If the server 10 is mutually connected with the third terminal 300, the server 10 may mutually send and receive data to and from the third terminal 300 through the communication network.

The server 10 may receive data from at least one of the first terminal 100, the second terminal 200, and the third terminal 300. The server 10 may perform an operation using the data received from at least one of the first terminal 100, the second terminal 200, and the third terminal 300. The server 10 may transmit a result of the operation to at least one of the first terminal 100, the second terminal 200, and the third terminal 300.

The server 10 may receive a video call mediating request from a plurality of terminals of the first terminal 100, the second terminal 200, and the third terminal 300. The server 10 may select the plurality of terminals that transmitted the mediating request. For example, the server 10 may select the first terminal 100 and the second terminal 200 among the first terminal 100, the second terminal 200, and the third terminal 300.

The server 10 may mediate a video call connection between the first terminal 100 and the second terminal 200. For example, the server 10 may transmit information of the connection with the first terminal 100 to the second terminal 200. As another example, the server 10 may transmit information of the connection with the second terminal 200 to the first terminal 100.

The information of the connection with the first terminal 100 may include, for example, an IP address and a port number of the first terminal 100. The second terminal 200 that received the information of the connection with the first terminal 100 may attempt to connect with the first terminal 100 using the received information of the connection.

The information of the connection with the second terminal 200 may include, for example, an IP address and a port number of the second terminal 200. The first terminal 100 that received the information of the connection with the second terminal 200 may attempt to connect with the second terminal 200 using the received information of the connection.

As the attempt by the first terminal 100 to connect with the second terminal 200 or the attempt by the second terminal 200 to connect with the first terminal 100 succeeds, the video call session between the first terminal 100 and the second terminal 200 may be established. Through the video call session, the first terminal 100 may transmit an image or audio to the second terminal 200. The first terminal 100 may encode the image or audio into a digital signal, and then transmit an encoded result to the second terminal 200.

Further, through the video call session, the first terminal 100 may receive an image or audio from the second terminal 200. The first terminal 100 may receive an image or audio encoded into a digital signal, and then decode the received image or audio.

Through the video call session, the second terminal 200 may transmit the image or audio to the first terminal 100. Further, through the video call session, the second terminal 200 may receive the image or audio from the first terminal 100. In this way, a user of the first terminal 100 and a user of the second terminal 200 may mutually have a video call.

The first terminal 100, the second terminal 200, and the third terminal 300 may, for example, be a desktop computer, a laptop computer, a smart phone, a smart tablet, a smart watch, a mobile terminal, a digital camera, a wearable device, or a portable electronic device, etc. Each of the first terminal 100, the second terminal 200, and the third terminal 300 may execute a program or an application. The first terminal 100, the second terminal 200, and the third terminal 300 may all be the same type of device, or may all be different types of devices.

Figure 2:
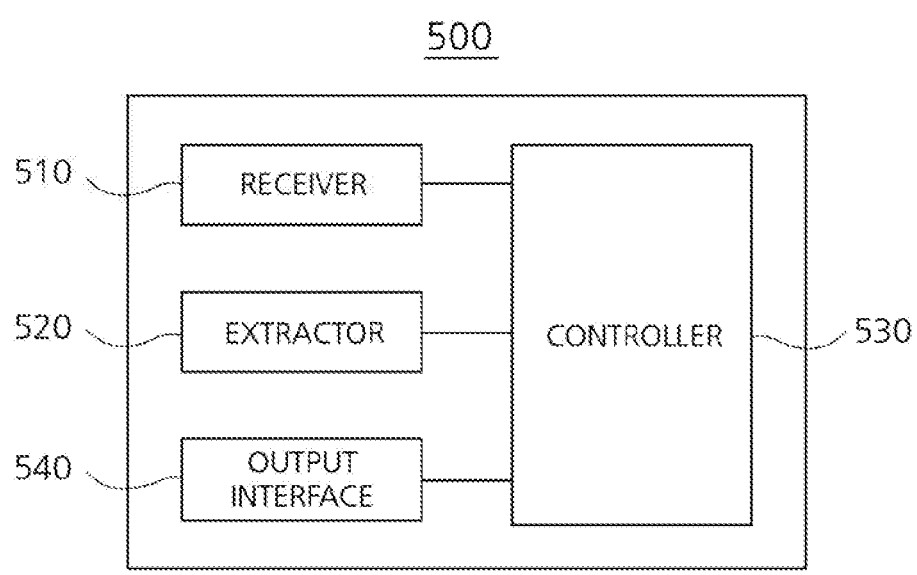
FIG. 2 is a view schematically illustrating a configuration of a video call mediating apparatus according to an embodiment of the present disclosure.

FIG. 2 is a view schematically illustrating a configuration of the video call mediating apparatus according to an embodiment of the present disclosure. Referring to FIG. 2, the video call mediating apparatus 500 according to an embodiment of the present disclosure includes a receiver 510, an extractor 520, a controller 530, and an output interface 540. The video call mediating apparatus 500 may be the server 10 described above with reference to FIG. 1, and may operate as a video call platform that mediates video calls between terminals in a communication network.

The receiver 510 receives the video call mediating request from a plurality of terminals. The plurality of terminals may be connected with the video call mediating apparatus 500 through a communication network, and the video call mediating request may be transmitted to the receiver 510 through the communication network.

Each of the plurality of terminals may be a desktop computer, a laptop computer, a smart phone, a smart tablet, a smart watch, a mobile terminal, a digital camera, a wearable device, or a portable electronic device, etc. as described above with reference to FIG. 1.

Further, the video call mediating request may be a request from one terminal to another specific terminal, but there is no limitation thereto, and thus it may be a request from any one terminal to another random terminal.

The extractor 520 may extract a unique identifier (ID) corresponding to a user of the terminal that transmitted the video call mediating request. The unique ID may be understood as a unique identifier assigned to the user of each terminal at the time of registering the user to be provided with the video call service through the video call mediating apparatus 500 or the video call platform.

The unique ID should not be the same as the unique ID pre-assigned to any other user using the video call service, and all the users using the video call service are assigned different unique IDs.

In this specification, for convenience of explanation, only cases where the unique ID consists of small cases alphabetic characters will be described as examples.

The controller 530 may provide a video call connection between at least two terminals among the plurality of terminals, may create an identification code for each of the at least two terminals connected by the video call, and may create a first image and a second image corresponding to the at least two terminals, respectively, with reference to the identification code.

The two terminals connected by the video call may be understood as the terminals that transmitted the video call mediating request to the receiver 510, and the two terminals of the plurality of terminals that transmitted the video call mediating request may each be determined as a video call counterpart. The rest of the terminals except for the two terminals may also be provided with the video call connection by the controller 530.

The identification code may be a unique value allocated to each terminal, and may correspond to the unique ID assigned to each user using the video call service. That is, the identification code may be created with reference to the unique ID.

The first image and the second image are created with reference to the identification code. If the two terminals connected by the video call are, for example, the first terminal and the second terminal, the first image and the second image correspond to the identification code of the first terminal and the second terminal, respectively. Since the first image and the second image are created with reference to the identification code of the first terminal and the second terminal, respectively, it may be understood that the first image and the second image correspond to the first terminal and the second terminal, respectively.

Since the identification code may be created with reference to the unique ID, the first image and the second image may be used as a means to specify the user of the first terminal and the user of the second terminal, respectively.

The output interface 540 may output the first image and the second image on the at least two terminals. Referring to the example mentioned above, the first image is output on the first terminal and the second image is output on the second terminal.

Meanwhile, the first image and the second image may combinations of a plurality of sub images, wherein the identification code may correspond to a number obtained by converting the unique ID into an antilogarithm number corresponding to the total number of the at least one sub images available.

Therefore, from the unique ID made up of small cases alphabetic characters, the identification code expressed in a n antilogarithm number may be created, and specifying images may be created from the identification code. The image created from the controller 530 may be matched one-to-one with the corresponding terminal and be used to specify the terminal.

Here, if the total number of types of the sub images that may be included in the first image and the second image is n, the identification code may be expressed in a n antilogarithm number. Therefore, if the total number of types of the sub images is 4, the identification code may be expressed in a 4 antilogarithm number. Numbers from 0 to 3 that may configure the identification code expressed in a 4 antilogarithm number may each be expressed in a different type of sub image.

The image created with reference to the identification code (including the first image and the second image) may include a letter, a number, a figure, and a photo, etc., and the sub image may also be made up of at least one of a letter, a number, a figure, and a photo. However, the image and the sub image may include a different type of object other than a letter, a number, a figure, and a photo.

Meanwhile, the first image may be displayed on the first terminal but not on the second terminal, and the second image may be displayed on the second terminal but not on the first terminal.

The output interface 540 may display the first image and the second image on a display of each of the at least two terminals in a floating form. The image displayed in a floating form may move along a random path on the display of the terminal. This may provide an interesting User experience of having a video call.

Figure 3:
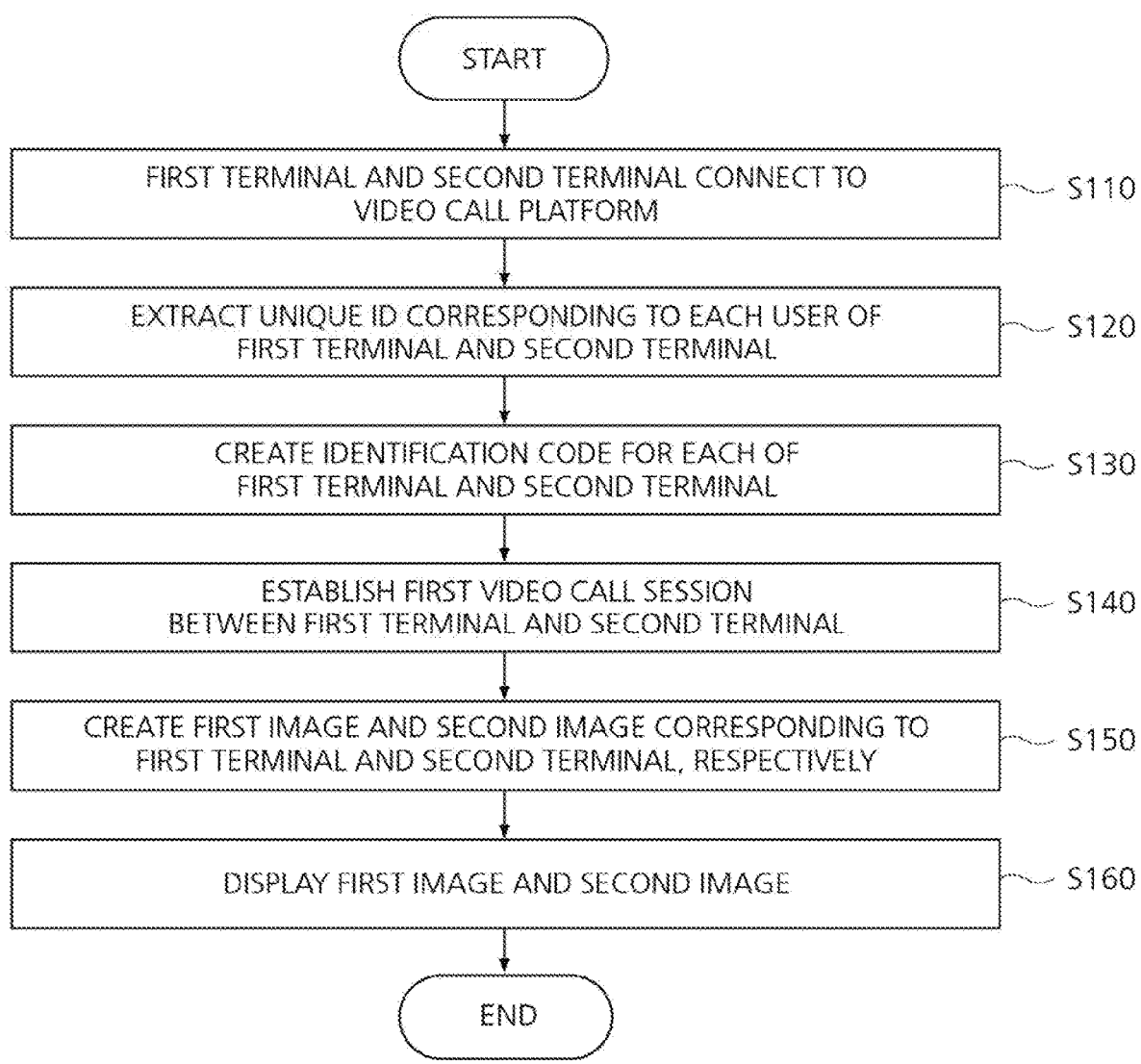
FIG. 3 is a flowchart illustrating a video call mediating method according to an embodiment of the present disclosure.

FIG. 3 is a flowchart illustrating the video call mediating method according to an embodiment of the present disclosure. Referring to FIG. 3, the video call mediating method according to an embodiment of the present disclosure includes a step of connecting, by the first terminal and the second terminal, to the video call platform (S110), a step of extracting the unique ID corresponding to each user of the first terminal and the second terminal (S120), a step of creating the identification code for each of the first terminal and the second terminal (S130), a step of establishing the first video call session between the first terminal and the second terminal (S140), a step of creating the first image and the second image corresponding to the first terminal and the second terminal, respectively (S150), and a step of displaying the first image and the second image (S160).

At S110, the video call platform that the first terminal and the second terminal connect to is a platform that provides the video call service to the terminals connected to a communication network, and the server 10 described above with reference to FIG. 1, or the video call mediating apparatus 500 described above with reference to FIG. 2 may be a type of the video call platform.

As the first terminal and the second terminal connect to the video call platform, they may be in a prepared state where they can receive the video call service.

At S120, the unique ID corresponding to each of the user of the first terminal and the second terminal is extracted, wherein the unique ID is not displayed on the first terminal or on the second terminal during the video call.

The unique ID may be understood as the unique identifier assigned to the user of each terminal at the time of registration as the user in order to be provided with the video call service through the video call platform, and the unique ID must not be the same as the unique ID pre-assigned to any other user using the video call service, and all the users using the video call service are assigned different unique IDs.

Therefore, each user may be specified through the unique ID, but for a more pleasant user experience, the unique ID may be set such that it is not displayed on the user terminal during the video call, or such that only a portion of the unique ID is displayed for privacy reasons. Therefore, the user performing the video call cannot know the exact unique ID of the counterpart of the video call.

Even if preventing exposure of the unique ID has a purpose of protecting privacy of users, there may exist users who exploit the protection of privacy, and thus it is desirable to prepare a method for specifying a user when necessary.

At step S120, the unique ID corresponding to the user of each terminal connected to the video call platform may be extracted, and preparations may be made to create a new form of identifier that can specify the user exploiting the service leaning on anonymity, that is the abuser.

Meanwhile, in this specification, for convenience of explanation, an assumption will be made that the unique IDs of all the users are made up of small cases alphabetic characters.

At S130, from the unique ID, the identification code is created for each of the first terminal and the second terminal. The identification code is a unique value assigned to each terminal, that may correspond to the unique ID assigned to each user using the video call service. That is, the identification code may be created with reference to the unique ID. The identification code is referred to when creating the first image and the second image at S150.

At S140, in response to the video call mediating request from the first terminal and the second terminal, a first video call session is established between the first terminal and the second terminal. The video call mediating request from the first terminal may not specify the user of the second terminal as the video call counterpart, but there is no limitation thereto.

That is, the video call mediating request may be a request from one terminal to another specific terminal, but there is no limitation thereto, and thus the video call mediating request may be a request from any one terminal to another random terminal.

It may be understood that the two terminals connected by the video call are the terminals that transmitted the video call mediating request, and two random terminals of the plurality of terminals that transmitted the video call mediating request may each be determined as the video call counterpart. In FIG. 3, it may be understood that the two random terminals are the first terminal and the second terminal.

At S150, with reference to the identification code created at step S130, the first image and the second image corresponding to the first terminal and the second terminal, respectively, are created.

For the first terminal and the second terminal connected by the first image call session, the first image and the second image correspond to the identification code of the first terminal and the second terminal, respectively. Since the first image and the second image are created with reference to the identification code of the first terminal and the second terminal, it may be understood that the first image and the second image correspond to the first terminal and the second terminal, respectively.

At S160, on the display of the first terminal and on the display of the second terminal, the first image and the second image are displayed, respectively. It may be understood that the display is a display provided in a desktop computer, a laptop computer, a smart phone, a smart tablet, a smart watch, a mobile terminal, a digital camera, a wearable device, or a portable electronic device, etc. as described above.

Meanwhile, the first image and the second image may be combinations of at least one sub images, wherein the identification code may correspond to a number obtained by converting the unique ID into an antilogarithm number corresponding to the total number of the at least one sub images available.

Therefore, from the unique ID made up of small cases alphabetic characters, the identification code expressed in a n antilogarithm number may be created, and specifying images may be created from the identification code. The specifying image may be matched one-to-one with the terminal and be used to specify a terminal. Further, since the identification code is created with reference to the unique ID, it is also possible to specify the user through the specifying image.

Meanwhile, if the total number of types of the sub images that may be included in the first image and the second image is n, the identification code may be expressed in a n antilogarithm number. Therefore, if the total number of types of the sub images is 4, the identification code may be expressed in a 4 antilogarithm number. Numbers from 0 to 3 that may configure the identification code expressed in 4 antilogarithm may each be expressed in a different type of sub image.

The image created with reference to the identification code (including the first image and the second image) may include a letter, a number, a figure, and a photo, etc., and the sub image may also be made up of at least one of a letter, a number, a figure, and a photo. However, the image and the sub image may include a different type of object other than a letter, a number, a figure, and a photo.

Meanwhile, the first image may be displayed on the first terminal but not on the second terminal, and the second image may be displayed on the second terminal but not on the first terminal.

Figure 4:
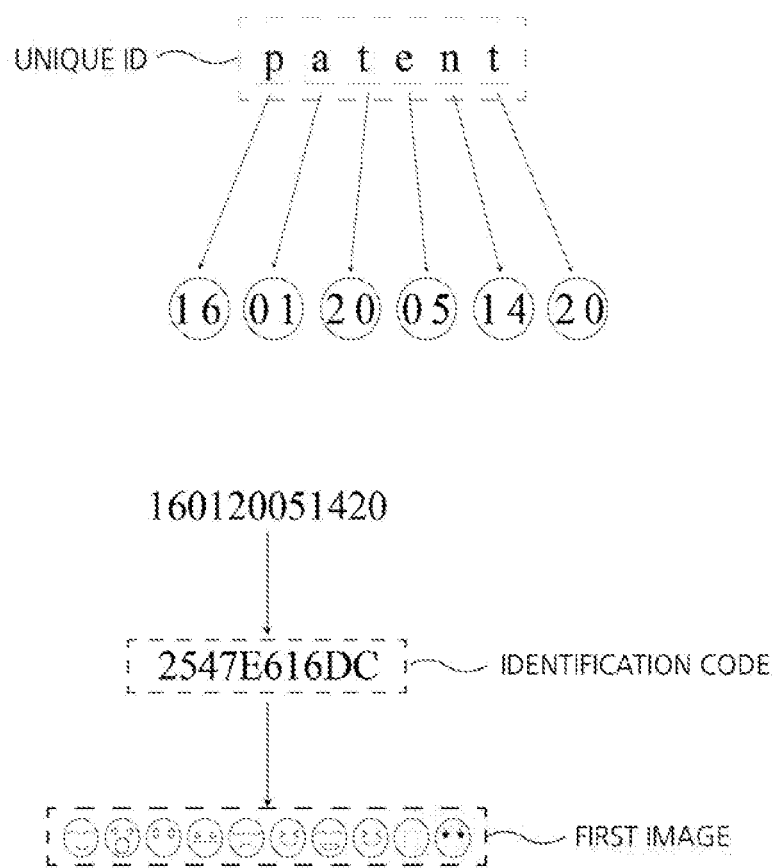
FIG. 4 is a view illustrating an example of a process in which a user specifying image is created from a unique ID.

FIG. 4 is a view illustrating an example of a process in which a user specifying image is created from the unique ID. In FIG. 4, an assumption will be made that the unique ID of a random terminal user is 'patent'.

Referring to FIG. 4, the unique ID 'patent' may be substituted with '160120051420', wherein the alphabets from a to z may correspond to the numbers from 1 to 26. Therefore, the '160120051420' may be distinguished into '16', '01', '20', '05', '14', and '20', and it may be understood that each of the distinguished numbers is in an equality relationship with a specific small case alphabetic character.

Referring to FIG. 3 and FIG. 4 together, at step S130, the identification code is created from the unique ID. Hereinafter, for convenience of explanation, the random terminal will be defined as the first terminal. The number which is in an equal relationship with the unique ID, that is, the number '160120051420', may be converted into an identification code, wherein the identification code may be displayed in a predetermined specific antilogarithm method. For example, if the total number of types of the sub images that may be included in the first image to be displayed on the first terminal is n, the identification code may be expressed in a n antilogarithm number.

The identification code, '2547E616DC', illustrated in FIG. 4 is obtained by converting '160120051420' into a 16 antilogarithm number, '160120051420' being the unique ID displayed in a 10 antilogarithm number (decimal number), and it may be understood that the total number of types of the sub images is 16. From 0 to F that may be included in the identification code may each correspond to the predetermined sub image, and with reference to FIG. 4, one can know that the identification code may be expressed as the first image including a plurality of sub images.

Meanwhile, the identification code is not necessarily expressed in a 16 antilogarithm number (hexadecimal number) always, and as described above, it will be apparent to those skilled in the related art that the identification code may be expressed in various antilogarithm numbers depending on the total number of types of the sub images.

In FIG. 4, it is illustrated that the sub image is emoji, but this is merely an embodiment of the present disclosure, and thus the sub image is not necessarily limited to only emoji.

The first image is displayed on only the first terminal, and not on the terminal of the video call counterpart of the first terminal. Meanwhile, if the total number of types of the sub image is 26, '160120051420', which is the number converted from the unique ID, can itself be the identification code. Here, the number '160120051420' may be distinguished as '16', '01', '20', '05', '14', and '20' as described above, and each of the distinguished numbers may be expressed as a predetermined sub image. Therefore, in such a case, the first image may consist of a total of 6 sub images. That is, it may be understood that each of the small case alphabetic characters corresponds one-to-one to 26 sub images.

Figure 5B:
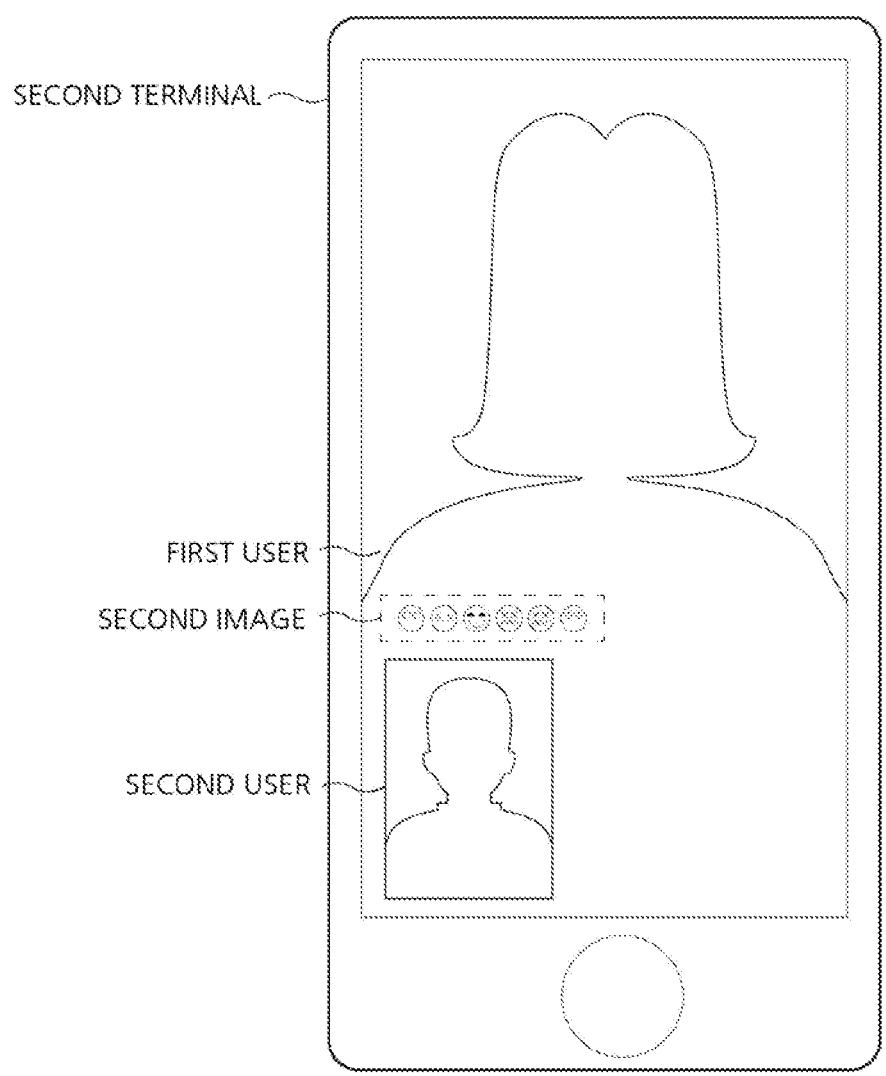

FIGS. 5A and 5B are views illustrating an example of how a user specifying image is displayed according to an embodiment of the present disclosure.

First of all, FIG. 5A illustrates the first terminal being used by the first user. The video call screen illustrated in FIG. 5A may be defined as the first video call session established between the first terminal and the second terminal. An area where the first video call session is displayed may be defined as the display of the first terminal, and the display may be distinguished into an area where the first user and the second user are displayed and an area where the first image is displayed.

The first image may consist of the plurality of sub images described above with reference to FIG. 4, and since the first image is displayed on only the first terminal that the first user uses, the second user cannot see the first image.

Meanwhile, in the case where the first user records the first video call session and opens it to the public, privacy infringement on the second user may occur. In such a case, a problem may occur that, even though the first user should be sanctioned not to use the video call service, if the ID of the first user is not exposed on the recorded screen, it may not be possible to specify the first user.

As described above, the first image may be used to specify the first user, and by performing, in reverse order, the operations of creating the identification code from the unique ID of the first user and then creating the first image, the unique ID of the first user can be derived from the first image.

Next, FIG. 5B illustrates the second terminal being used by the second user. The video call screen illustrated in FIG. 5B may be defined as the first video call session established between the first terminal and the second terminal. An area where the first video call session is displayed may be defined as the display of the second terminal, and the display may be distinguished into an area where the first user and the second user are displayed and an area where the second image is displayed.

The second image may consist of the plurality of sub images described above with reference to FIG. 4, and since the second image is displayed on only the second terminal that the second user uses, the first user cannot see the second image.

Meanwhile, in the case where the second user records the first video call session and opens it to the public, privacy infringement on the first user may occur. In such a case, a problem may occur that, even though the second user should be sanctioned not to use the video call service, if the ID of the second user is not exposed on the recorded screen, it may not be possible to specify the second user.

The second image may be used to specify the second user, and by performing, in reverse order, the operations of creating the identification code from the unique ID of the second user and then creating the second image, the unique ID of the second user can be derived from the second image.

As described above with reference to FIGS. 5A and 5B, in the case where a video call that does not expose a user's ID infringes upon another user's privacy, the image call mediating apparatus and method according to the present disclosure provides a method for specifying the user who infringed upon privacy of the other user. The video call mediating apparatus and method according to the present disclosure exposes a specifying image that corresponds to the unique ID of the user on the video call screen, and therefore provides a new visual effect and also the effect of specifying the user responsible if a privacy infringement occurs.

Figure 6A:
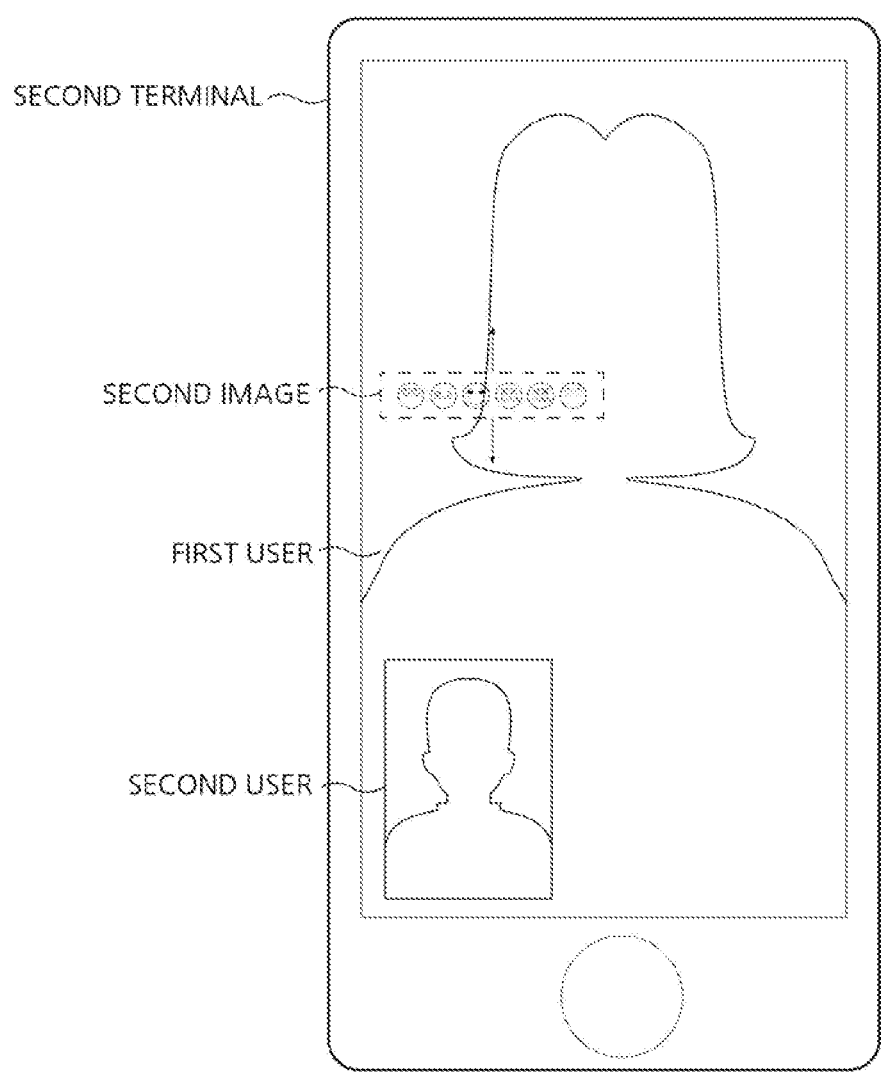
FIGS. 6A and 6B are views illustrating an example of how a user specifying image is displayed according to another embodiment of the present disclosure.
Figure 6B:
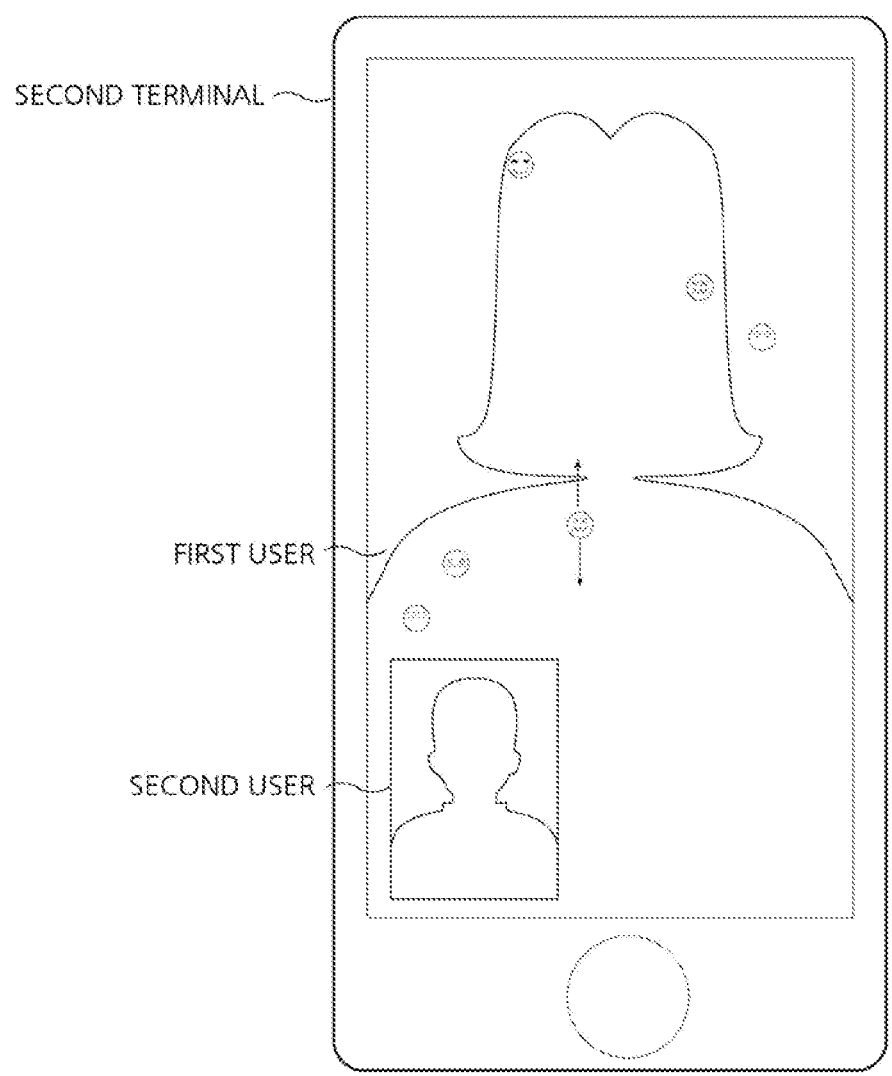

FIGS. 6A and 6B are views illustrating an example of how a user specifying image is displayed according to another embodiment of the present disclosure. The image for specifying a user according to an embodiment of the present disclosure, for example, the first image or the second image may be displayed on the display of the terminal in a floating form.

Referring to FIG. 6A, the second image displayed on the second terminal of the second user may move in up and down directions, which is different from the form displayed on FIG. 5B. The second image may continuously move on the display of the second terminal while the first video call session is being maintained, and the directions are not necessarily limited to up and down directions. Therefore, the second image may move to up and down, left and right, and diagonal directions.

Referring to FIG. 6B, the plurality of sub images that make up the second image may move independently. Therefore, they can have a greater degree of freedom compared to the embodiment illustrated in FIG. 6A. However, since a user cannot be specified if the order, for example, the left-right order of the sub images changes, the sub images may move while maintaining their order.

FIGS. 6A and 6B illustrate the second image as an example, but the display method in a floating form is not limited to the second image. Therefore, together with the first image, the third image and the fourth image may also be displayed in a floating form.

FIG. 7 is a flowchart illustrating the image call mediating method according to another embodiment of the present disclosure. Referring to FIG. 7, the image call mediating method according to another embodiment of the present disclosure includes a step of connecting, by a third terminal, to the video call platform (S170), a step of extracting the unique ID of the user of the third terminal and creating the identification code (S180), a step of ending the first image call session (S190), a step of establishing a second video call session between the first terminal and the third terminal (S200), a step of creating a third image corresponding to the third terminal (S210), and a step of displaying the first image and the third image (S220).

The third terminal is a terminal being used by a third user, who is different from the first user or the second user, and it may be understood that the third user is a user using the video call service just as the first user and the second user. At S180, the unique ID of the user of the third terminal who connected to the video call platform at S170, is extracted. Further, using the method described above with reference to the drawings attached, the identification code is created from the unique ID.

At S190, the first image call session is ended, wherein the first video call session may be ended by a request from the first terminal or the second terminal. The request to end the video call session may be a request to end the video call service, or a request to end the current video call session and establish a new video call session. For example, the request to end the video call session may be a request from the first terminal to establish a new video call session.

When the first video call session is ended at the request from the first terminal or the second terminal at S190, the second video call session, which is a new video call session, is established between the first terminal and the third terminal at S200. When the third video call session is established, the first terminal and the third terminal may send and receive various data that includes audio and images to and from each other through the third video call session.

At S210, with reference to the identification code for the third terminal created at S180, the third image corresponding to the third terminal, is created. The method for creating the third image is the same as the method described above with reference to FIGS. 3 and 4, and thus specific explanation of overlapping contents will be omitted.

At S220, on the display of the first terminal and the display of the third display, the first image and the third image are displayed, respectively. The first image refers to the same image as the first image created at S150 described above with reference to FIG. 3. That is, the image created to correspond to a specific terminal may be maintained the same without change even when a new video call session is established. Meanwhile, according to another embodiment of the present disclosure, when an existing video call session is ended and a new video call session is established, a new image that is different from the existing image, may be created.

Figure 8B:
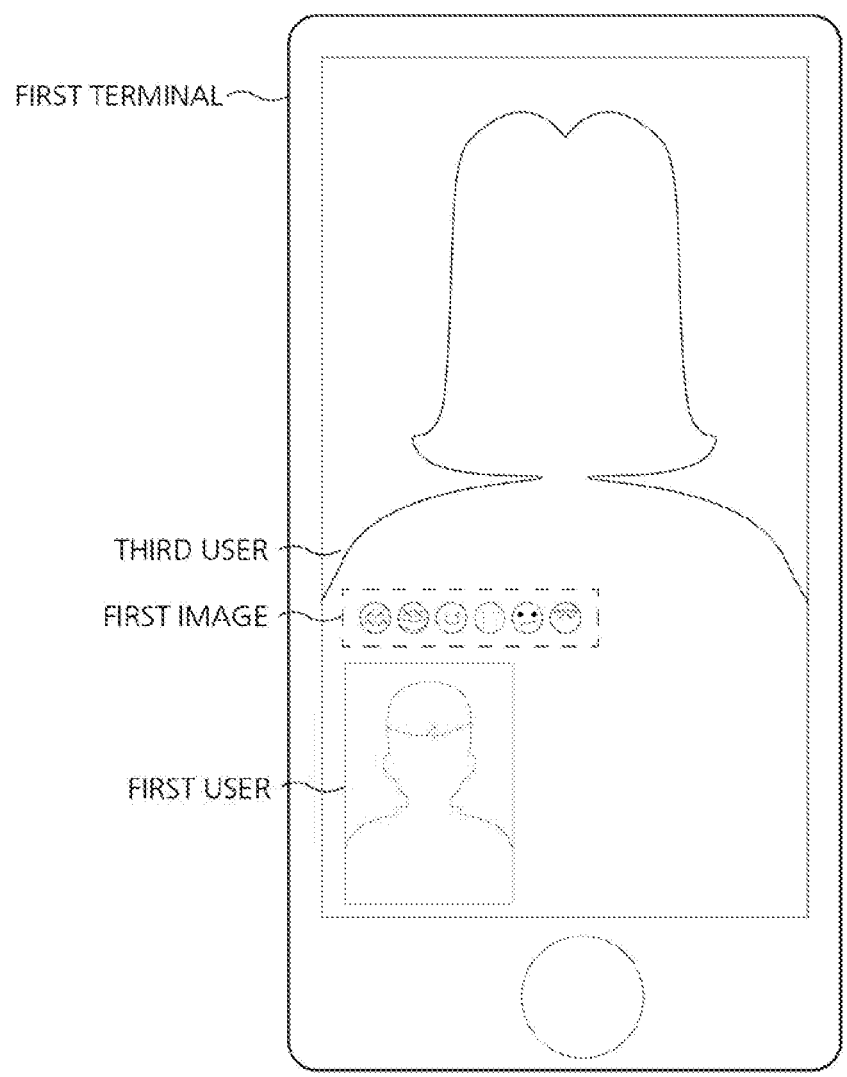

FIGS. 8A and 8B are views illustrating an example of how a user specifying image is displayed according to another embodiment of the present disclosure.

First of all, FIG. 8A illustrates the first terminal being used by the first user. The video call screen illustrated in FIG. 8A may be defined as the second video call session established between the first terminal and the third terminal. The area where the second video call session is displayed may be defined as the display of the first terminal, and the display may be distinguished into the area where the first user and the third user are displayed and the area where the first image is displayed.

According to an embodiment, even when a new video call session is established, an image corresponding to one terminal may not change, and the first image illustrated in FIG. 8A may be the same as the first image illustrated in FIG. 5A. That is, when the first video call session is established between the first terminal and the second terminal, the first image for specifying the first user may be used in the same way in the second video call session established between the first terminal and the third terminal after the first video call session is ended.

Meanwhile, the first image is displayed on only the first terminal, and thus the third user cannot see the first image. However, since the first image is used for the purpose of specifying the first user, if a privacy infringement occurs upon the third user, it may be possible to specify the first user using the first image.

Next, FIG. 8B illustrates the third terminal being used by the third user. The video call screen illustrated in FIG. 8B may be defined as the second video call session established between the first terminal and the third terminal. The area where the second video call session is displayed may be defined as the display of the third terminal, and the display may be distinguished into the area where the first user and the third user are displayed and the area where the third image is displayed.

The third image is for specifying the third user, and thus the third image is different from the first image or the second image illustrated in FIG. 5, and it is also different from the first image illustrated in FIG. 8A.

Figure 9:
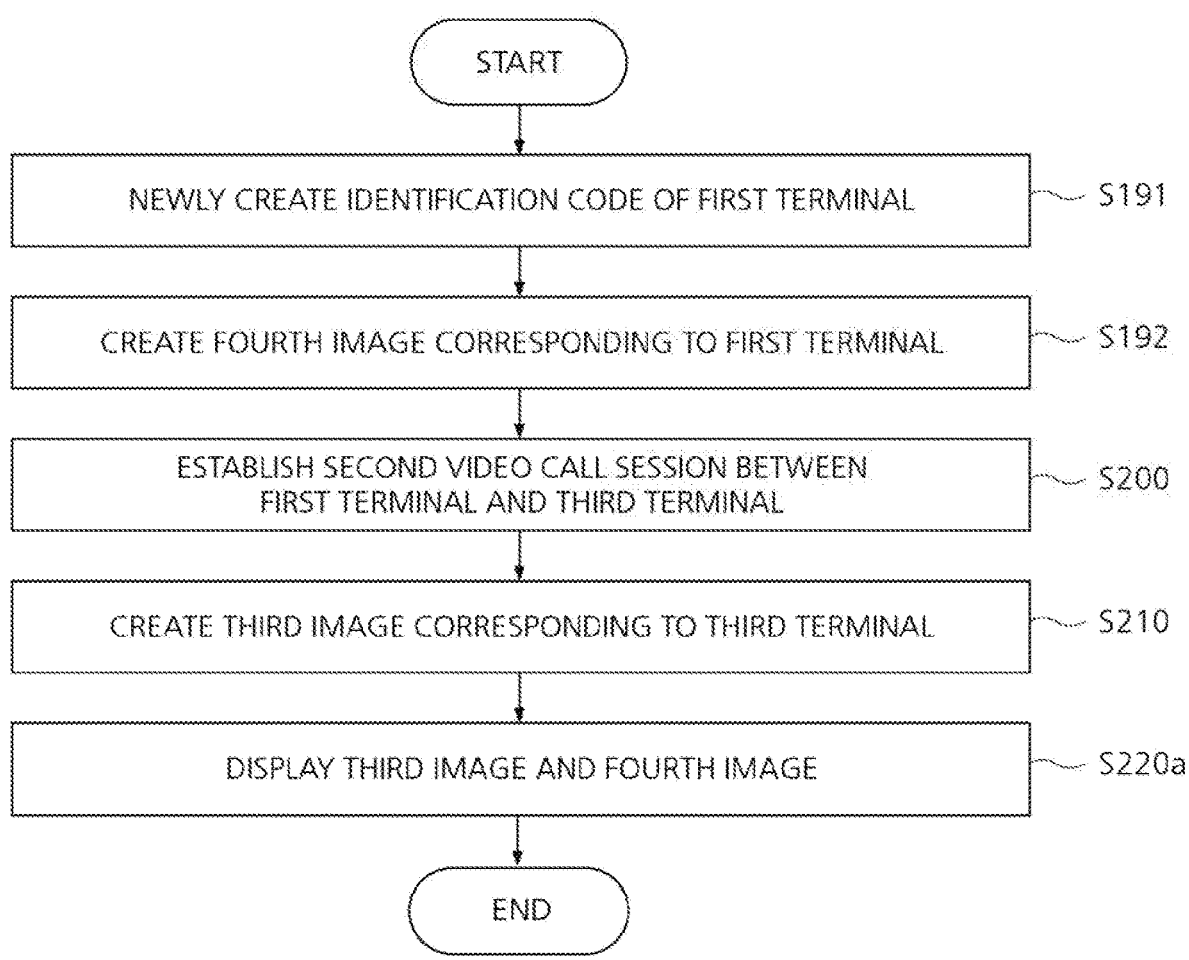
FIG. 9 is a flowchart illustrating a video call mediating method according to another embodiment of the present disclosure.

FIG. 9 is a flowchart illustrating the video call mediating method according to another embodiment of the present disclosure. Referring to FIG. 9, the video call mediating method according to the another embodiment of the present disclosure includes a step of newly creating an identification code of the first terminal (S191), a step of creating a fourth image corresponding to the first terminal (S192), a step of establishing a second video call session between the first terminal and the third terminal (S200), a step of creating a third image corresponding to the third terminal (S210), and a step of displaying the third image and the fourth image (S220*a*).

At step S191, in response to the first video call session being ended between the first terminal and the second terminal, the identification code corresponding to the first terminal is newly created. As described above, the identification code is dependent on the unique ID of the user, and a plurality of mutually different identification codes may be created from the same unique ID utilizing a random value and a check sum.

Further, since the image for specifying a user is created with reference to the identification code, at S192, a new image can be created with reference to the identification code newly created at S191. Therefore, the fourth image newly created at S191 may be different from the first image.

As described above with reference to FIGS. 7 and 8, even when an existing video call session is ended and a new video call session is established, the same image may be used for a specific user. The video call mediating method illustrated in FIG. 9 may create and display a new image as the existing video call session is ended, and thereby make the user feel a change of atmosphere.

At steps S200 and S210, the same operations described above for step S200 and step S210 with reference to FIG. 7, are performed. Meanwhile, at step S220*a*, substantially the same operations as those at step S220 of FIG. 7 are performed, but the fourth image displayed at step S220*a* is different from the first image displayed at step S220*a*.

Figure 10:
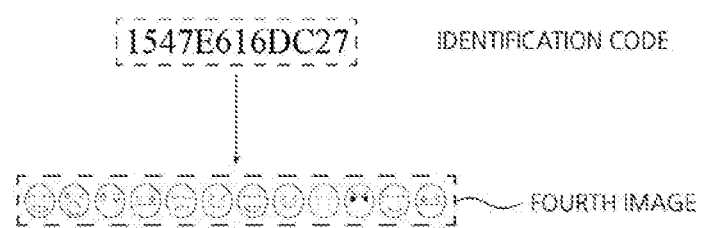
FIG. 10 is a view illustrating an example of a method for creating a user specifying image according to another embodiment of the present disclosure.

FIG. 10 is a view illustrating an example of the method for creating a user specifying image according to another embodiment of the present disclosure. As described above with reference to FIG. 9, when a new video call session is established, an image different from the user specifying image used in the existing video call session may be newly created. However, since the unique ID of a user is not a value that changes, a new image may be created by applying an appropriate conversion to the identification code created from the unique ID.

According to an embodiment, a random value and a check sum may be used to create the new image. Hereinafter, description will be based on an example where the random value is a 16 antilogarithm number just as the identification code. However, the random value is a single digit number, and the check sum is defined as the remainder obtained by dividing the sum of each digit of the identification code and the random value by 16.

The random value may be added to the very first digit of the identification code, and the check sum may be added to the very last digit of the identification code. For example, when the identification code '2547E616DC' is created from 'patent' which is the unique ID of the first user, the random value from 0 to F may be added in front of '2' which is the very first digit number. Further, after the very last digit 'C', the check sum from 0 to F may be added.

The random value may play the role of changing each digit of the identification code. For example, in the case where '0' is set as the random value, '6' may be determined as the check sum, wherein the identification code may be converted into '02547E616DC6'. A setting may be made not to change each digit of the identification code created from the unique ID, if the random value is '0'. Meanwhile, a setting may be made to move each digit of the identification code forward if the random value is '1'. For example, if the random value is '1', the identification code '2547E616DC' may be converted into '1547E616DC2'. Further, here, the check sum may be determined to be '7'. Therefore, the identification code may ultimately be converted into '1547E616DC27'.

The fourth image illustrated in FIG. 10 is an image that may specify the first user having the unique ID 'patent'. The fourth image is different from the first image, but may specify the same user. In the case of calculating the unique ID with reference to the fourth image, '547E616DC2' may be obtained with the first sub image and the last sub image removed, and since the first sub image corresponds to '1', from '547E616DC2', '2547E616DC' may be determined as the ultimate identification code. Therefore, the unique ID 'patent' may be derived from the fourth image.

Figure 11:
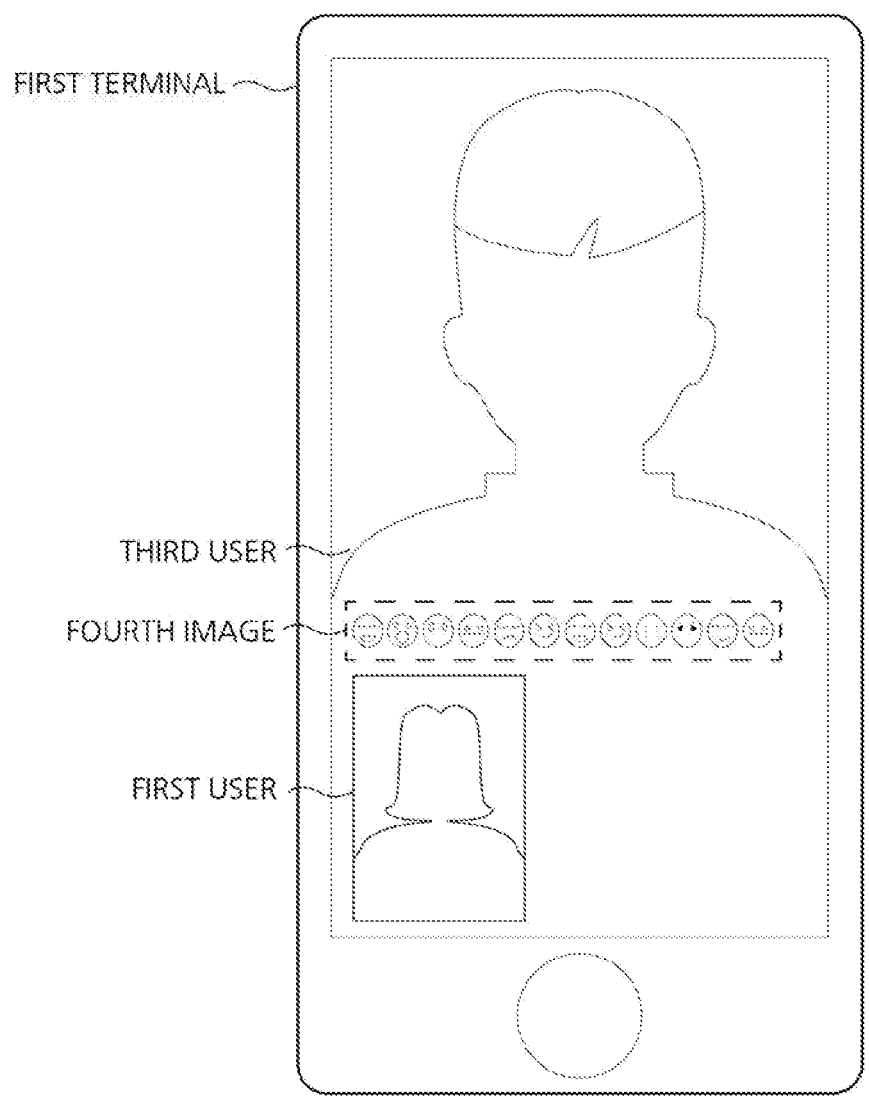
FIG. 11 is a view illustrating an example of how a user specifying image is displayed according to another embodiment of the present disclosure.

FIG. 11 is a view illustrating an example of how the user specifying image is displayed according to another embodiment of the present disclosure.

FIG. 11 illustrates the first terminal that is being used by the first user. The video call screen illustrated in FIG. 11 may be defined as the second video call session established between the first terminal and the third terminal. The second video call session is distinguished from the first video call session established between the first terminal and the second terminal.

The second video call session illustrated in FIG. 11 is substantially the same as the second video call session illustrated in FIG. 8A, but the fourth image for specifying the first user who is the user of the first terminal is different from the first image of FIG. 8A. However, the first image and the fourth image are the same in that they may both specify the first user.

Meanwhile, in the case were the first user ends the second video call session, and a new video call session, for example, a third video call session is established between the first terminal and the fourth terminal, a new image that is different from both the first image and the fourth image, may be created.

Figure 12:
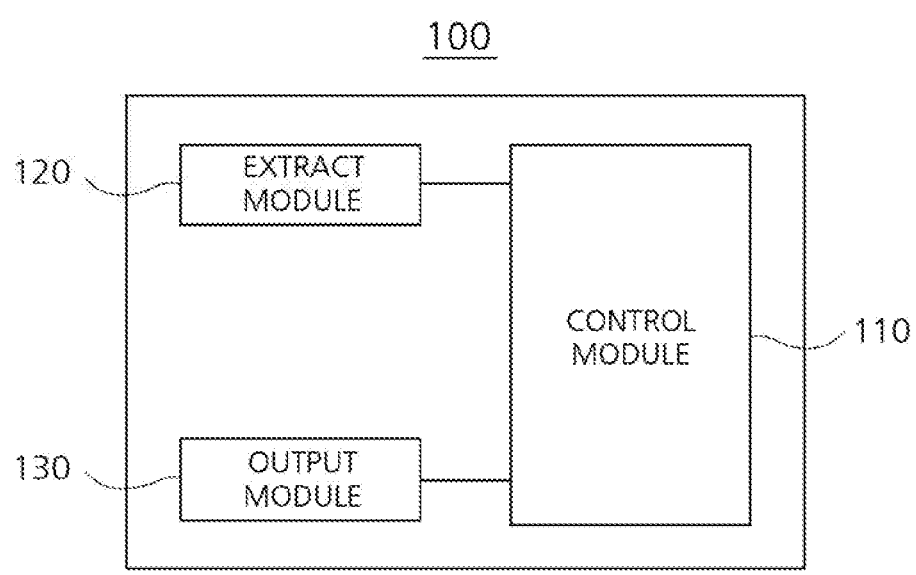
FIG. 12 is a view schematically illustrating a configuration of a terminal apparatus according to an embodiment of the present disclosure.

FIG. 12 is a view schematically illustrating a configuration of a terminal apparatus according to an embodiment of the present disclosure. Referring to FIG. 12, the terminal apparatus 100 according to an embodiment of the present disclosure includes a control module 110, an extract module 120, and an output module 130. The control module 110 enables the terminal apparatus 100 to connect to the video call platform, and, by transmitting a video call mediating request, enables a video call session to be established between the terminal apparatus 100 and another terminal apparatus. Further, the control module 110 may control the operations of the extract module 120 and the output module 130.

The extract module 120 extracts account information for the user of the terminal apparatus 100 to connect to the video call platform. The unique ID described above may be included in the account information.

The control module 110 creates the identification code from the unique ID extracted by the extract module 120, and with reference to the identification code again, the control module 110 creates a user specifying image. The method in which the control module 110 extracts the unique ID and creates the identification code and the user specifying image may be the same as the method described above with reference to the drawings attached. Further, it may be understood that the user specifying image has the same characteristics as the first to fourth images described above with reference to the drawings attached.

Therefore, when a new video call session is established, the control module 110 may create a new user specifying image, and the user specifying image may include a plurality of sub images. Further, the user specifying image may move freely on the display of the terminal apparatus 100, and the plurality of sub images may move independently from one another. However, the user specifying image is used for the purpose to specify the user of the terminal apparatus 100, and thus it is desirable not to change the arrangement order of the plurality of sub images.

The output module 130 outputs the image that can specify the user of the terminal apparatus 100 on the display provided in the terminal apparatus 100.

Meanwhile, it may be understood that the first to third terminals described above in the embodiments of the present disclosure include substantially the same configuration as the terminal apparatus 100 illustrated in FIG. 12.

The embodiments described above may also be implemented in the form of a recording medium including instructions executable by a computer, such as program modules, being executed by a computer. Computer readable media may be any available media that can be accessed by a computer, and may include both volatile and nonvolatile media, removable and non-removable media.

Further, the computer readable media may include computer storage media. The computer storage media may include both volatile and nonvolatile, removable and non-removable media implemented in any method or technology for storage of information such as computer readable instructions, data structures, program modules or other data.

At least one of the components, elements, modules or units (collectively "components" in this paragraph) represented by a block in the drawings such as FIG. 2 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Although embodiments of the present disclosure have been described with reference to the accompanying drawings, a person having ordinary knowledge in the technical field to which the present invention pertains will understand that the embodiments may be implemented in other forms without changing the technical concept or essential features of the present disclosure. Therefore, the embodiments described above are to be understood in all respects as illustrative and not restrictive.

What is claimed is:

1. A video call mediating method comprising:
   connecting, by a first terminal and a second terminal, to a video call platform;
   extracting a first identifier (ID) of a user of the first terminal and a second ID of a user of the second terminal, that is not displayed on the first terminal and the second terminal, during a video call;
   creating a first identification code for the first terminal and a second identification code of the second terminal from the first ID and the second ID, respectively;
   establishing a first video call session between the first terminal and the second terminal;
   creating a first image and a second image corresponding to the first terminal and the second terminal, respectively, with reference to the first identification code and the second identification code, respectively; and displaying the first image and the second image on a display of the first terminal and on a display of the second terminal, respectively.

2. The video call mediating method according to claim 1, wherein the first image and the second image are a combination of a plurality of sub images.

3. The video call mediating method according to claim 2, wherein each of the first identification code and the second identification code corresponds to a number obtained by converting each of the first ID and the second ID into an antilogarithm number corresponding to a total number of the plurality of sub images available.

4. The video call mediating method according to claim 3, wherein the first image and the second image include the sub image predetermined according to a number corresponding to each digit of the antilogarithm number.

5. The video call mediating method according to claim 1, wherein the displaying the first image and the second image comprises displaying the first image and the second image on the display of the first terminal and the display of the second terminal, in a floating form.

6. The video call mediating method according to claim 1, further comprising:
connecting, by a third terminal, to the video call platform;
extracting a third ID of a user of the third terminal and creating a third identification code for the third terminal from the third ID;
ending the first video call session;
establishing a second video call session between the first terminal and the third terminal;
creating a third image corresponding to the third terminal with reference to the third identification code; and
displaying the first image and third image on the display of the first terminal and on a display of the third terminal.

7. The video call mediating method according to claim 6, further comprising:
newly creating the first identification code corresponding to the first terminal in response to the first video call session being ended;
creating a fourth image corresponding to the first terminal with reference to the newly created first identification code; and
displaying the fourth image on the display of the first terminal.

8. The video call mediating method according to claim 6, wherein the third image is a combination of a plurality of sub images, and
wherein the creating the third identification code corresponding to the third terminal includes converting the third ID of the user of the third terminal into an antilogarithm number corresponding to a number of the plurality of sub images available.

9. A non-transitory computer readable recording medium where a program for performing a method according to claim 1 is recorded.

10. A video call mediating apparatus comprising:
a receiver receiving a video call mediating request from a plurality of terminals;
an extractor extracting a unique identifier corresponding to a user of a terminal that transmits the video call mediating request;
a controller providing video call connection between at least two terminals among the plurality of terminals, creating an identification code for each of the at least two terminals connected by the video call connection, and creating a first image and a second image corresponding to the at least two terminals, respectively, with reference to the identification code; and
an output interface outputting the first image and the second image on the at least two terminals.

11. The video call mediating apparatus according to claim 10,
wherein the first image and the second image are a combination of a plurality of sub images.

12. The video call mediating apparatus according to claim 11,
wherein the identification code corresponds to a number obtained by converting the unique ID into an antilogarithm number corresponding to a total number of the plurality of sub images available.

13. The video call mediating apparatus according to claim 12,
wherein the first image and the second image include the sub image predetermined according to a number corresponding to each digit of the antilogarithm number.

14. The video call mediating apparatus according to claim 10,
wherein the output interface displays the first image and the second image on displays of the at least two terminals, respectively, in a floating form.

* * * * *